US006956453B2

(12) United States Patent
Osterberg

(10) Patent No.: US 6,956,453 B2
(45) Date of Patent: Oct. 18, 2005

(54) BI-STABLE MAGNETIC LATCH

(75) Inventor: David A. Osterberg, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 147 days.

(21) Appl. No.: 10/636,718

(22) Filed: Aug. 6, 2003

(65) Prior Publication Data

US 2005/0029819 A1 Feb. 10, 2005

(51) Int. Cl.[7] .................................................. H01F 7/00
(52) U.S. Cl. ......................................... 335/229; 310/32
(58) Field of Search ................................ 335/220–234, 335/253–254, 272–274; 310/12, 14, 32–38

(56) References Cited

U.S. PATENT DOCUMENTS 4,164,722 A * 8/1979 Garvey ....................... 335/272
4,529,270 A 7/1985 Moss et al.
5,303,012 A * 4/1994 Horlacher et al. .......... 335/253
6,377,380 B1 4/2002 Plesko
6,507,257 B2 * 1/2003 Mohler ....................... 335/220
2002/0027393 A1 3/2002 Brown

FOREIGN PATENT DOCUMENTS

CH 583475 A 12/1976
EP 0652629 A 5/1995
FR 81416 E 9/1963

* cited by examiner

*Primary Examiner*—Lincoln Donovan

(57) ABSTRACT

A magnetic bi-stable latch with an upper stator and a lower stator, a rotor between the upper stator and lower stator and adapted for rotation between a first latched position and a second latched position. Each of the stators is a magnetic assembly having at least two inner poles and two outer poles of magnetic material, and at least one stator further having a coil disposed in relation to the inner pole and the outer pole to form an electromagnet. The stators are positioned such that the outer poles of the upper stator align with the inner poles of the lower stator and the inner poles of the upper stator align with the outer poles of the lower stator. The rotor has permanent magnets mounted thereon such that in the first latched position the permanent magnets are aligned with poles of the upper and lower stators.

27 Claims, 4 Drawing Sheets

12,14

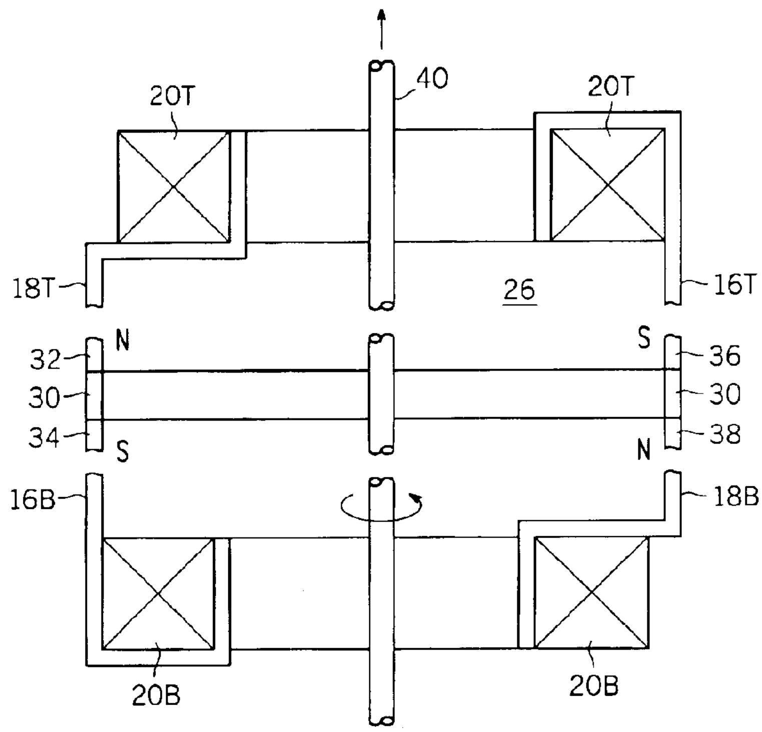
FIG. 4
FIG. 5A
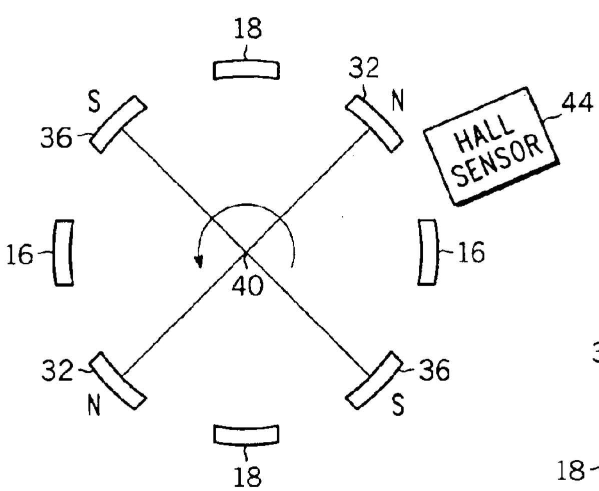
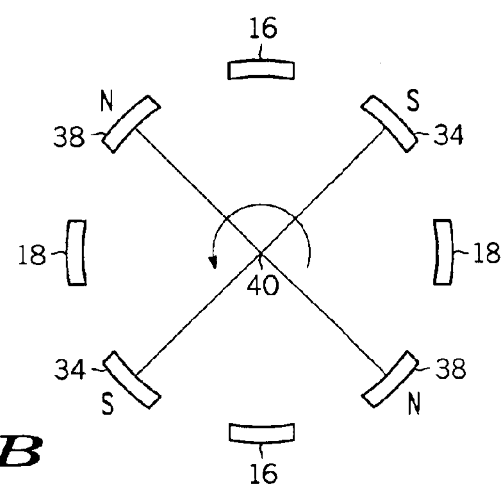
FIG. 5B

BI-STABLE MAGNETIC LATCH

TECHNICAL FIELD

The present invention generally relates to magnetic latches, and more particularly relates to limited rotation active magnetic devices.

BACKGROUND

There are certain situations for which a bi-stable latch is particularly suited. For example there is a need for a device that could be used to hold a refrigerator door open or closed, or a deployable appendage deployed or stowed. Another use for the bi-stable latch of the present invention is to provide high speed switching for optical elements. Such a switching mechanism is provided in U.S. patent application Ser. No. 10/103,534 to David A. Osterberg, filed Mar. 20, 2002, and assigned to the assignee of the present invention. Various systems and devices such as, for example; optical test instruments and equipment, include one or more optical elements, which may be provided to implement, for example, optical filtering. In some of these systems, it may be desirable to simultaneously switch one or more optical elements into and out of an optical path. Preferably, this optical element switching operation is performed relatively rapidly.

In the past, rapid and simultaneous optical element switching has been accomplished using, for example, a wheel mechanism that is configured to rotate the optical elements into and out of the optical path. In one exemplary wheel mechanism embodiment, the optical elements are arranged around the perimeter of a wheel. As different optical elements are to be moved into and out of the optical axis, a motor or other driver rotates the wheel, stopping when the desired optical element is in the optical path.

Although wheel mechanisms generally operate safely, these mechanisms also suffer certain disadvantages. For example, the configuration of many of these wheel mechanisms provides for sequential, rather than random, access to the elements at the edges of the wheel. As a result, the amount of time and energy that may be used to switch one element into the optical path and another optical element out of the optical path can be undesirably high. This may be most pronounced when the wheel is used to move optical elements into and out of the optical paths that are located on opposite sides of the wheel.

Another drawback of some known wheel mechanisms is that rapid movement of the wheel can cause disturbances in the system. These disturbances can result in, for example, image blur. This can be a significant factor in applications that implement precise optical system control such as, for example, in satellite applications. To compensate for the disturbances a rapidly moving wheel may cause, some systems may implement long settling periods after wheel movement. Other systems may use complex force compensation and/or isolation mechanisms, which can increase the system complexity and, in some cases, simultaneously decrease system reliability. Moreover, some of these complex mechanisms may also dissipate significant power, which can negatively impact the thermal profile of the system.

Hence, there is a need for a switching mechanism that addresses one or more of the above-noted drawbacks. Namely, a switching mechanism that supplies relatively high-speed switching speeds, and/or that dissipates relatively low amounts of power, and/or does not cause significant system disturbances. The present invention addresses one or more of these needs. Furthermore, other desirable features and characteristics of the present invention will become apparent from the subsequent detailed description and the appended claims, taken in conjunction with the accompanying drawings and the foregoing technical field and background.

BRIEF SUMMARY

A magnetic bi-stable latch with an upper stator and a lower stator, a rotor between the upper stator and lower stator and adapted for rotation between a first latched position and a second latched position is provided. Each of the stators is a magnetic assembly having at least two inner poles and two outer poles of magnetic material, and at least one stator further having a coil disposed in relation to the inner pole and the outer pole to form an electromagnet. The stators are positioned such that the outer poles of the upper stator align with the inner poles of the lower stator and the inner poles of the upper stator align with the outer poles of the lower stator. The rotor has permanent magnets mounted thereon such that in the first latched position the permanent magnets are aligned with poles of the upper and lower stators.

BRIEF DESCRIPTION OF THE DRAWINGS

The present invention will hereinafter be described in conjunction with the following drawing figures, wherein like numerals denote like elements, and FIG. 1 Is a drawing of one portion of a magnetics assembly usable in the present invention;

FIG. 4 is a sketch showing a complete but simplified exploded (for clarity) view of the bi-stable latch and the magnetic paths.

FIG. 5A and FIG. 5B show, respectively, top views of the planes of contact of the components of the bi-stable latch having two inner poles and two outer poles on each of the upper and lower stator magnetic assemblies.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The device of the present invention will be described in term of a preferred embodiment, but it is understood that other configurations may be used. The device described has two stators and a rotor intermediate the stators. Each stator has a plurality of pole pieces (also called spiders) and is designed with an even number of poles. The number of poles can be selected in accordance with the angular travel required between poles. In this case the preferred embodiment utilizes eight poles and thirty degrees of rotation. More poles decrease the size of the device (for the same latching moment) but reduce the permitted travel of the rotor.

The device of the present invention is applied herein to a fast pivot mechanism utilized to latch a pivoted device in one of two positions. The device will be seen to have several advantages over previous designs, for example wheel designs or other magnetic latch designs. First, the latch of the present invention applies a moment around the rotation axis of the rotor rather than a force. Internally the device applies several forces in different directions summing to zero, however they are coupled to apply a pure moment. The unique magnetic path within the device, as will be discussed in some detail later, allows two stators to be used that have external actuation coils. Since the coils are external there are few limitations as to how large they may be. Simply extending the magnetic path of the stators and installing a larger coil will reduce the power and increase the efficiency of the device, by reducing the power necessary to unlatch the device from one of its two positions. Hereinafter the two stators are described as identical stators though they need not be identical. For example, as described above, and in accordance with a preferred embodiment of the invention, two coils are described, one each in association with the two stators. It is possible, however, to have only one coil, associated with only one of the stators, to accomplish the objectives of the invention.

Figure 1:
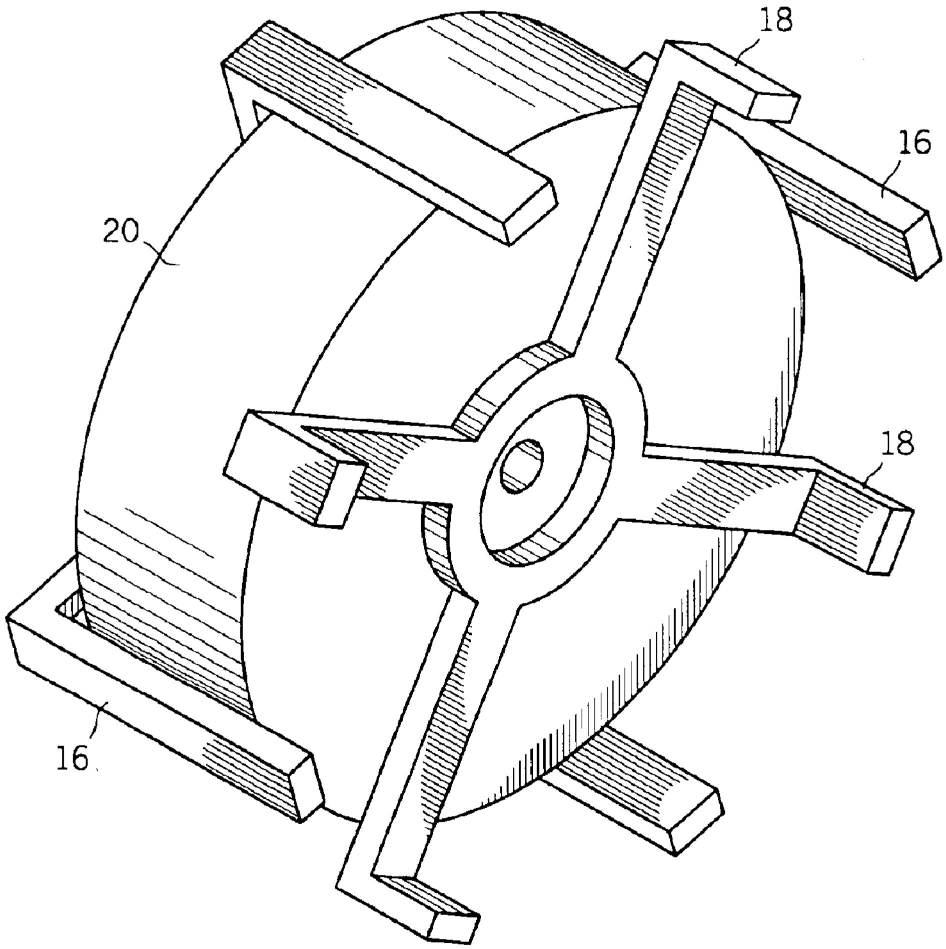

For purposes of this detailed description of a preferred embodiment, the structure and operation of the bi-stable latch will be described using all three of FIG. 1, FIG. 2, and FIG. 3 since different components of the latch are shown more clearly in different drawings. FIG. 1 is a drawing of a magnetics assembly according to the invention. Each of the magnetic assemblies 12 and 14 comprises (FIG. 1 and FIG. 2) outer pole pieces or "spiders" 16 and inner pole pieces or "spiders" 18 and a torroidal coil 20. Again, as noted previously, the invention may be practiced with the use of only one coil associated with one of the stators.

Figure 2:
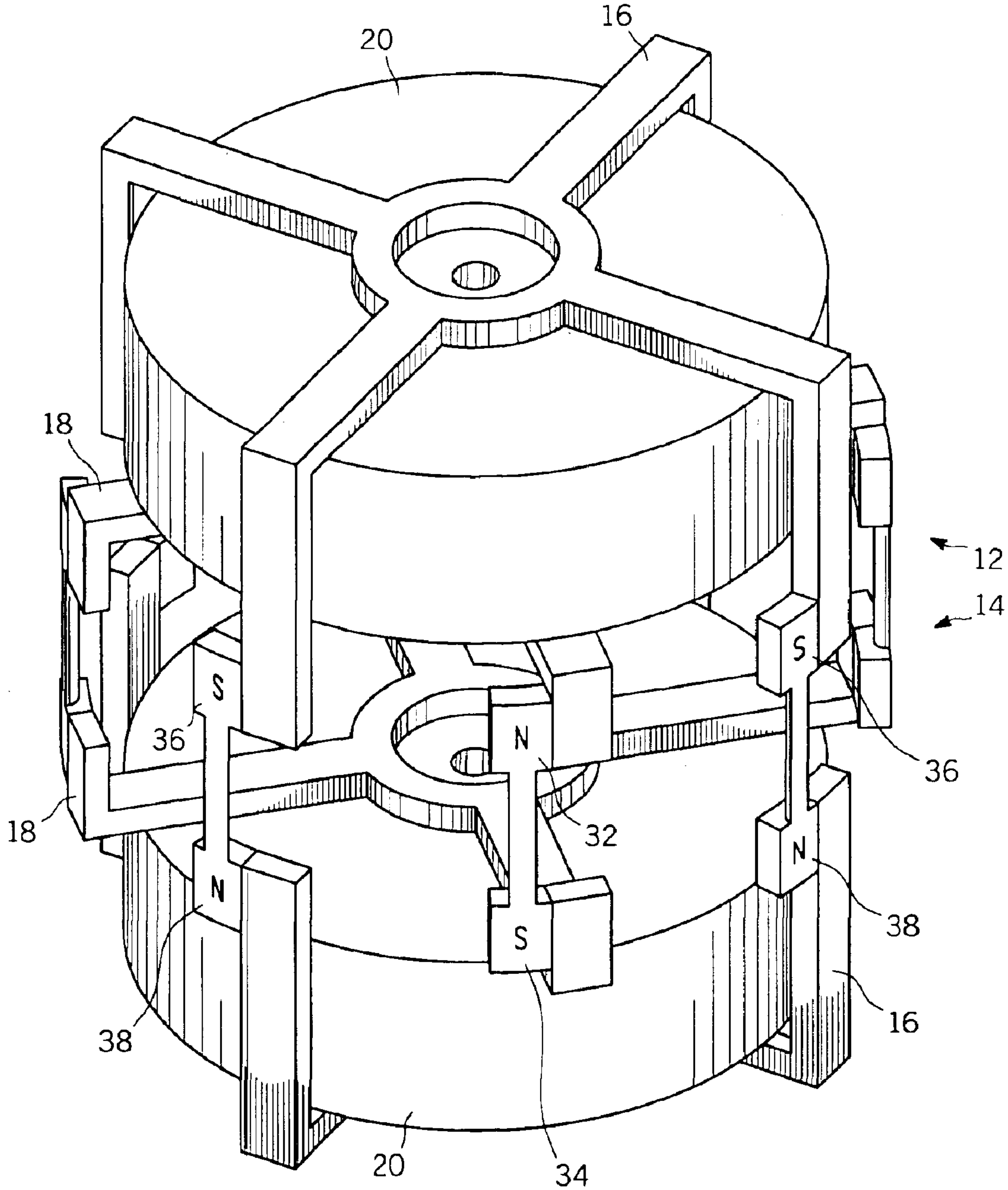
FIG. 2 is a drawing showing two of the magnetics assemblies of FIG. 1 together with a plurality of magnets.

The actual latch of the invention comprises two such magnetic assemblies, a top assembly 12 and a bottom assembly 14 as is shown in FIG. 2. Between the upper magnetics assembly and the lower magnetics assembly is a rotor assembly 26 (not shown in FIG. 2 for purposes of clarity, but shown in FIG. 3) that supports a plurality of magnets 30, preferably permanent magnets, including alternating upper pole (north) pole pieces 32, lower pole (south) pole pieces 34, upper pole (south) pole pieces 36, and lower pole (north) pole pieces 38. The rotor assembly 26 is attached to a rotor shaft 40 as shown in FIG. 3. The rotor shaft 40 may be any shaft affixed to the rotor 26 including a shaft that is capable of applying torsion to the rotor 26 when the rotor is in either of its terminal or latched positions, such as a torsion bar or a shaft biased by a torsion spring, for example. The rotor shaft need not be a shaft under torsion, however, as the repulsive effect of the electromagnet, as will be described in more detail later, begins the movement of the rotor from a first position to a second position. The use of a torsion rod, or a rotor shaft under torsion makes the switching from a first latched position to a second latched position faster.

Figure 3:
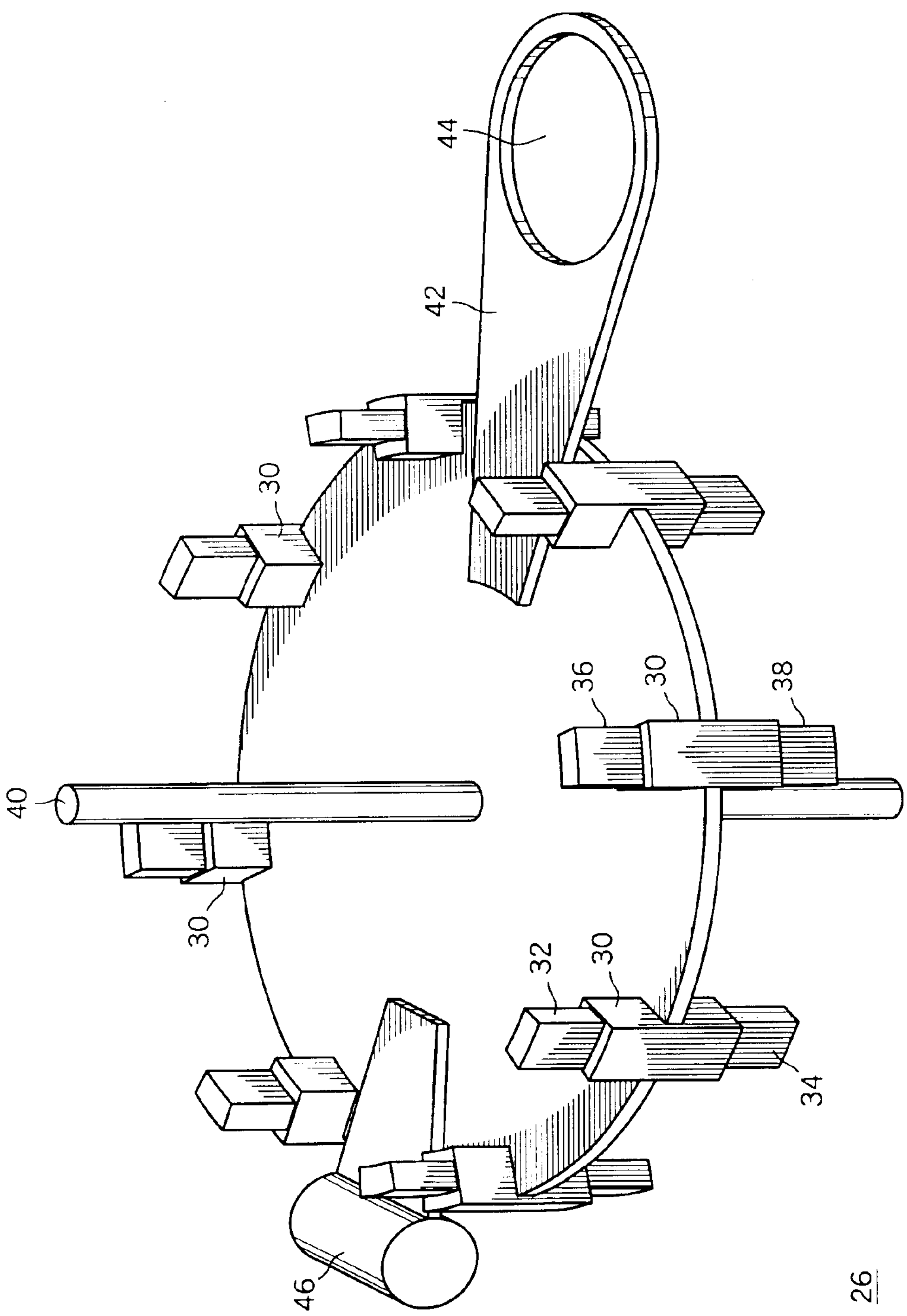
FIG. 3 is a drawing of a rotor assembly usable in the present invention, together with an optical filter arrangement.

Also shown in FIG. 3 is a holder arm 42 attached to the rotor assembly 26 such that as the rotor assembly rotates, on optical filter or other device 44 is rotated into out of registration with a desired location. The rotor assembly 26 may also comprise a counterweight 46 to assist in providing minimum disturbance to the assembly during motion.

The stators 12 and 14 of FIG. 1 and FIG. 2 are shown as identical, but as previously noted, they need not be. They must, however, have similar magnetic paths. The torroidal coil 20 has two iron pole pieces 16, 18 wrapped around it as shown in the FIGS. The pole pieces 16, 18 are designed with an even number of poles (here, eight) and joined with the coil 20 to form the stator assembly. As noted, the number of poles can be selected for the angular travel required of the pivotable member 42. More poles decrease the size (for the same latching moment) but reduce the travel. When the upper stator 22 and the lower stator 24 are joined in the assembly of the latch, one of the stators is rotated one pole so that an inner pole on one stator aligns with an outer pole on the other stator.

Each of the stator magnetic assemblies has four pole pairs making eight pole pairs for the two stators. The rotor 26 may be machined from a non-magnetic material such as aluminum and has the same number of pole pairs the spiders, in this case eight. Each of the eight magnets 30, of course has two poles associated with it so that when the stators and rotor are assembled each magnet aligns with an inner pole of one stator and an outer pole of the other stator. The magnets 30 are installed in the rotor in alternating directions so that when viewed from the top or the bottom the polarities alternate between north and south as shown in FIG. 2 and FIG. 3. Iron pole pieces 32, 34, 36, 38 previously described are installed at each end of each individual magnet 30 mating with the iron poles of the spiders 16, 18.

When assembled the rotor 26 is free to rotate while supported on rotor shaft 40 between the poles of the spiders 16 and 24. The pole pieces of the spiders 16, 18 serve as detents to the rotation of the rotor 26. The thickness of the poles in this example was designed to allow thirty degrees of free rotation, although as previously noted, the number of stator poles also determines the degree of free rotation of the rotor 26.

FIG. 4 is a schematic diagram showing the magnetic circuit established during the operation of the latch when the rotor is at either of its latched positions. The schematic shows only two each of the upper and lower pole pieces, it being understood that in the preferred embodiment there are eight of each and that any even number of pole pieces may be used depending upon the rotational angle desired, etc. The schematic is also shown as partially exploded for clarity, it being understood that the pole pieces of the upper and lower magnetics assemblies may act as detents to the pole pieces of the rotor magnets to limit the rotation of the rotor.

The rotor 26, or, more precisely, the magnets 30 and poles 32, 34, 36, and 38, complete the magnetic circuit that starts at a rotor magnet 30, flows through rotor pole piece 36, then follows the outer pole spider 16T through one coil 20T (of the top magnetic assembly 12 in this example) then out the inner pole 18T across the second magnet 30 (in an additive direction) and through the outer pole 16B of the bottom magnetic assembly, across the bottom magnetic assembly coil 20B through the inner pole piece 18B and then through magnet 30 of that assembly and back out the rotor pole piece 38 to the magnet 30 where it started. As previously noted, it is possible to eliminate one of the coils, in which case the circuit is completed through the pole pieces of the stator that lacks a coil. Since In the preferred embodiment there are four poles (and eight pole pieces) in each of the upper and lower magnetic assemblies, there are four parallel paths through which the magnetic circuit is completed, each path utilizing two upper and two lower pole pieces. The rotor 26, of course, rotates around rotor shaft 40.

The magnetic reluctance causes the magnets 30 of the rotor 26 to be attracted to the pole respective upper or lower pole pieces of the stators at each end of its travel, generating a bi-stable magnetic detent at two locations. The latch is released by driving a current pulse through the coils 20 in a direction opposing the flux in the iron of the pole pieces 16, 18, 32, 34, 36, and 38. The opposing flux generated by the electromagnet counteracts the flux of the permanent magnets and, if sufficiently strong, can have a repulsive effect upon the magnets, driving them toward the other latching position. The coils 20 may also be energized in the other direction to release from the opposite detent. Thus a positive pulse causes the latch to switch to one state and the opposite pulse causes it to switch to the other state, the torsion of the rotor shaft in this example providing additional momentum to complete the switch. The circuit could be used without a torsion spring mechanism applied to the rotor shaft, however, but the power consumption would usually be greater in such a configuration as the latching attraction would by necessity be greater.

FIG. 5A and FIG. 5B show, respectively, top views of the planes of contact of the components of a bi-stable latch in accordance with the invention, but having two inner poles and two outer poles on each of the upper and lower stator magnetic assemblies. These diagrams, shown with the rotor between detents at the upper and lower poles, show the relative positioning among the various poles of the magnets of the rotor 26 and the upper and lower magnetic assembly spiders 16 and 18. In FIGS. 5A and 5B inner poles 16 and outer poles 18 of the top and bottom magnetic assemblies are shown, as are the pole pieces 32, 34, 36 and 38 of the rotor magnets 30. The magnets 30, of course cannot be seen in these views as they are below the pole pieces. As can be appreciated, as the rotor pole 32, for example moves toward inner pole 18 (FIG. 5A) the pole 18 acts as a detent stopping the rotation of the rotor. Since there are four pole pairs in each of the upper and lower assemblies and eight pole pairs in the rotor, contact is made with all poles simultaneously thus forming four parallel flux paths and two detents.

Should active control be desired to allow more precise control a flux sensor, such as a Hall sensor 44 (in FIG. 5A), may be installed in the gap to sense magnetic flux. This sensor can then be used to control the detent torque since flux density is approximately proportional to output torque. During passive operation i.e., when the coil is not energized, this sensor also gives an indication of the state of the device. The two detent points give a strong positive and negative flux reading while a near-zero flux indication represents a rotor half-way between the detents.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A magnetic bi-stable latch comprising:

an upper stator and a lower stator, a rotor disposed between the upper stator and lower stator and adapted for limited rotation between a first latched position and a second latched position;

each of the upper stator and lower stator comprising a magnetic assembly having at least two inner poles and two outer poles of magnetic material, and at least one stator having coil coupled to the inner poles and the outer poles to form an electromagnet;

the stators positioned such that the outer poles of the upper stator align with the inner poles of the lower stator and the inner poles of the upper stator align with the outer poles of the lower stator;

the rotor having at least a first permanent magnet and a second permanent magnet mounted thereon and disposed such that in the first latched position the first permanent magnet is aligned with an outer pole of the upper stator and an inner pole of the lower stator and the second permanent magnet is aligned with an inner pole of the upper stator and an outer pole of the lower stator;

thereby forming a magnetic circuit including the first magnet, the outer poles of the upper and lower stators, and the second permanent magnet, the magnetic flux of the circuit thus latching the rotor in a first position.

2. A magnetic bi-stable latch as set forth in claim 1 wherein the coil is energized with an electrical current of a polarity such that a flux is generated in the magnetic elements to overcome the latching flux, thereby releasing the rotor from its first latched position.

3. A magnetic bi-stable latch as set forth in claim 2 wherein, upon release from the first latched position the rotor rotates to the second latched position.

4. A magnetic bi-stable latch as set forth in claim 3 wherein the coil is energized with an electrical current of a polarity such that a flux is generated in the magnetic elements to overcome the latching flux, thereby releasing the rotor from its second latched position.

5. A magnetic bi-stable latch as set forth in claim 1 wherein the rotor is mounted for rotation about a rotor shaft.

6. A magnetic bi-stable latch as set forth in claim 5 wherein the rotor shaft is under rotational torsion when the rotor is in the first latched position and in the second latched position, thereby aiding the release form the latched positions.

7. A magnetic bi-stable latch as set forth in claim 6 wherein the torsion is provided by a torsion spring.

8. A magnetic bi-stable latch as set forth in claim 6 wherein the rotor shaft is a torsion rod.

9. A magnetic bi-sable latch as set forth in claim 1 wherein the upper stator and the lower stator each comprise four inner poles and four outer poles, and the rotor comprises four permanent magnets.

10. A magnetic latch as set forth in claim 1 further comprising a second coil associated with the other stator to form a second electromagnet.

11. A magnetic bi-stable latch comprising:

a first stator having at least a first pole piece and a second pole piece and a first coil coupled to the first pole piece and the second pole piece to form a first electromagnet;

a second stator having at least a third pole piece and a fourth pole piece and a second coil coupled to the third pole piece and the fourth pole piece to form a second electromagnet; and a rotor intermediate the first stator and the second stator and having at least a first permanent magnet and a second permanent magnet on the rotor and spaced such that the first magnet may, in a first position, be aligned with and abutted to the first pole piece and the third pole piece, and the second magnet in a first position, be aligned with the second pole piece and the fourth pole piece, thereby establishing a latching flux from the first pole piece through the first permanent magnet, through the third pole piece and the second permanent magnet to the first pole piece.

12. A magnetic bi-stable latch as set forth in claim 11 wherein the first electromagnet and the second electromagnet are energized with an electrical current of a polarity such that a flux is generated in the electromagnets to overcome the latching flux, thereby releasing the rotor from its first latched position.

13. A magnetic bi-stable latch as set forth in claim 12 wherein, upon release from the first latched position the rotor rotates to a second latched position where the flux latches the rotor in the second latched position.

14. A magnetic bi-stable latch as set forth in claim 13 wherein the first electromagnet and the second electromagnet are energized with am electrical current of a polarity such that a flux is generated in the electromagnets to overcome the latching flux, thereby releasing the rotor from its second latched position.

15. A magnetic bi-stable latch as set forth in claim 11 wherein the rotor is mounted for rotation about a rotor shaft.

16. A magnetic bi-stable latch as set forth in claim 15 wherein the rotor shaft is under rotational torsion when the rotor is in the first latched position and in the second latched position, thereby aiding the release form the latched positions.

17. A magnetic hi-stable latch as set forth in claim 16 wherein the torsion is provided by a torsion spring.

18. A magnetic bi-stable latch as set forth in claim 17 wherein the rotor shaft is a torsion rod.

19. A bi-stable magnetic latch, comprising a rotor, a first stator and a second stator, the rotor having a plurality of permanent magnets;

the first stator and the second stator each comprising a plurality of pole pieces of magnetic material coupled to a coil thus forming a first and second electromagnets;

the rotor being mounted between the first stator and the second stator; and the permanent magnet of the rotor being located such that in a first latched position permanent magnets of the rotor complete a magnetic circuit with the pole pieces of the first stator and the second stator and in a second latched position the permanent magnets of the rotor complete a magnetic circuit with the pole pieces of the first stator and the second stator;

whereby the magnetic flux produced by the magnets of the rotor bias the rotor toward either the first or the second position.

20. A magnetic bi-stable latch as set forth in claim 19 wherein the electromagnets of each stator are energized with an electrical current of a polarity such that a flux is generated in the electromagnets to overcome the biasing flux, thereby releasing the rotor from its first latched position.

21. A magnetic bi-stable latch as set forth in claim 20 wherein, upon release from the first latched position the rotor rotates to the second latched position.

22. A magnetic bi-stable latch as set forth in claim 21 further comprising a sensor for sensing the position of the rotor and providing a feedback signal to the electromagnet circuit.

23. A magnetic bi-stable latch as set forth in claim 22 wherein the sensor is a Hall effect sensor.

24. A magnetic bi-stable latch as set forth in claim 21 wherein the electromagnets arc energized with an electrical current of a polarity such that a flux is generated in the electromagnets to overcome the latching flux, thereby releasing the rotor from its second latched position.

25. A magnetic bi-stable latch as set forth in claim 24 wherein the rotor is mounted for rotation about a rotor shaft under rotational torsion when the rotor is in the first latched position and in the second latched position, thereby aiding the release form the latched positions.

26. A magnetic bi-stable latch as set forth in claim 25 wherein the torsion is provided by a torsion spring.

27. A magnetic bi-stable latch as set forth in claim 26 wherein the rotor shaft is a torsion rod.

* * * * *